Oct. 4, 1927.
J. L. G. DYKES
1,644,327
MOLDING AND VULCANIZING APPARATUS
Filed Sept. 18, 1926
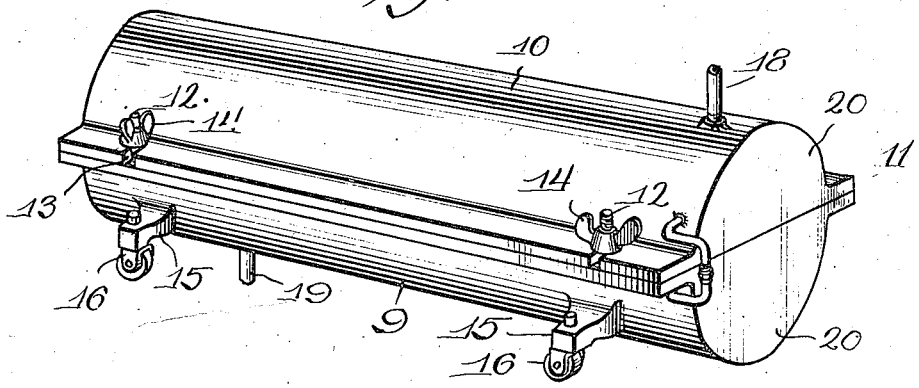
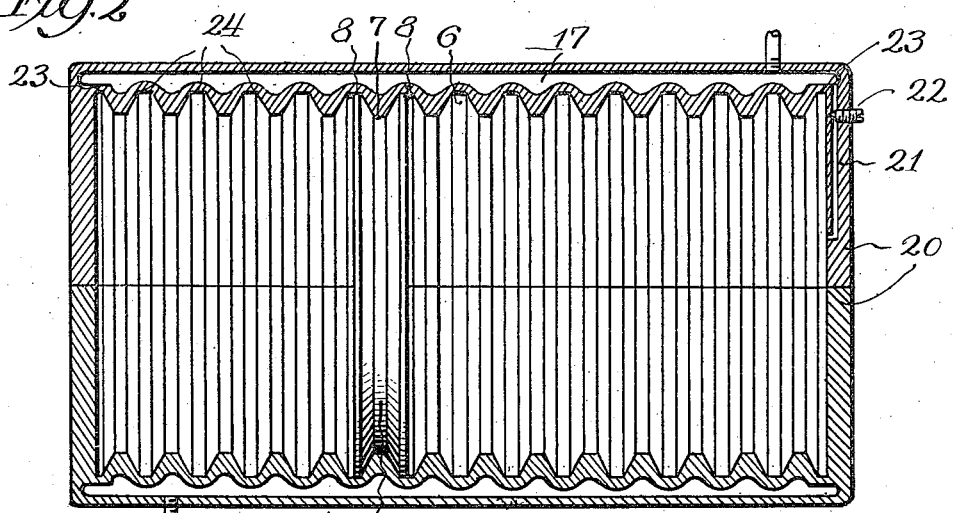
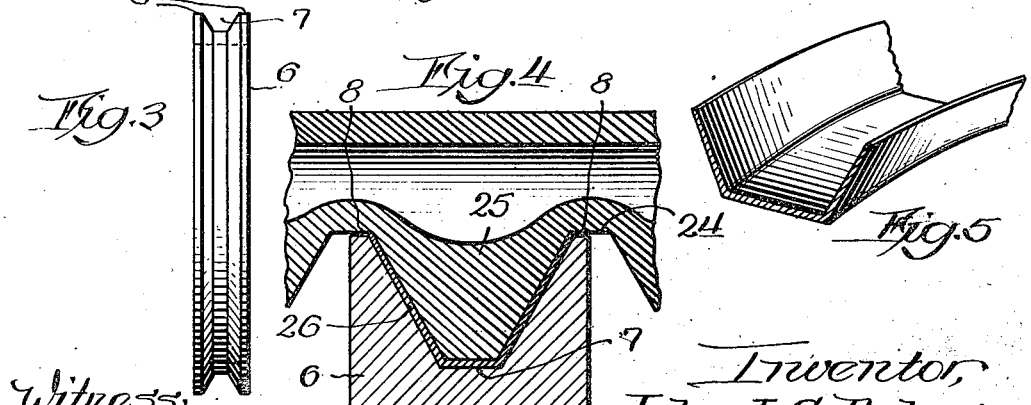

Patented Oct. 4, 1927.

1,644,327

UNITED STATES PATENT OFFICE.

JOHN L. G. DYKES, OF CHICAGO, ILLINOIS.

MOLDING AND VULCANIZING APPARATUS.

Application filed September 18, 1926. Serial No. 136,241.

My present invention relates to improvements in a molding and vulcanizing apparatus, and has special reference to the provision of apparatus for molding and vulcanizing vehicle tire flaps, vehicle tire bead fillers, fan belts for automobiles, and, in fact, annular, circular, or endless objects generally.

I believe that it may be taken as an established principle of good practice that a considerable mass of metal in a mold for forming and vulcanizing rubber or rubber and fabric is desirable not only because a considerable mass of metal provides the strength for exerting the desired pressures, but, also, because a greater mass of metal gives up heat slower and there is less liability of fluctuations from the desired temperature. However, metal in itself is expensive, it takes up room, and it costs money to heat.

It has been my object to provide molding and vulcanizing apparatus which will have even greater mass so far as strength giving and heat holding properties are concerned, but will have a great deal less mass of metal so far as the individual article under treatment is concerned. My apparatus will greatly economize room or space and heat and will tend to the production of a more uniform and dependable product. Also, as will hereafter be seen, by providing my apparatus with a double or triple set of interior matrices the manual operations connected with putting the material to be molded and vulcanized in place may be performed while a filling of the apparatus is being treated, thereby keeping the apparatus more continually in operation and economizing time.

I attain the foregoing objects and results by means of the apparatus illustrated in the accompanying drawing, in which—

Fig. 1 is a perspective of one form of my improved molding and vulcanizing apparatus;

Fig. 2 is a central, vertical, longitudinal, section of the structure shown in Fig. 1;

Fig. 3 is an edge view of one of the interior matrices;

Fig. 4 is a fragmental section, on a considerably larger scale, showing the relation of interior matrix, product, and casing; and Fig. 5 is a fragmental perspective of a typical form of product capable of production with my apparatus.

Similar reference characters have been employed to designate similar parts throughout the several views.

I have illustrated a form of my invention suitable for the production of inner flaps for vehicle tires or casings, although, as is obvious, it may be employed to advantage in producing bead fillers for vehicle tire casings, automobile fan belts, or, in fact, almost any variety of annular object.

Essential portions of my device are a suitable number of interior matrices consisting of annuluses or rings, 6. The sides of the interior matrices are carefully formed so as to abut one to another and to the ends of the compartment, and in their edges are produced depressions, 7, of the form and configuration of the interior surface of the article to be produced, which is a flap for a vehicle tire in the apparatus illustrated. The depression 7 is so produced as to leave on both sides thereof a cylindrical edge 8 which co-operates with complementary portions of the casing so as to separate the molding cavities one from another.

The casing comprises a lower member, 9, and an upper member, 10, suitably secured together. For securing these members together I have shown them provided upon their longitudinal meeting edges with flanges, one set of these flanges being hinged together, as at 11, one of the remaining flanges being provided with stud bolts, 12, and the remaining flange being slotted, as at 13, for the passage of the stud bolts. Wing-nuts, 14, co-operate with the stud bolts for securing the necessary pressure and holding the casing members in closed position. Of course, the above described method of holding together and producing pressure between the casing members is only one of several which may be employed without in any way altering the manner of functioning of the apparatus or the character of the product obtained by the use of the invention. For instance, if sufficient pressure can not easily be obtained by means of the stud bolts and wing-nuts the casing members may be brought together in a press, hydraulic or otherwise.

I have shown the lower casing member 9 provided with projections, 15, to which are attached casters, 16, for greater convenience in moving the apparatus as may be required.

The two casing members 9 and 10 have double longitudinal walls so as to provide therebetween a compartment, 17, for the receipt of heating fluid. The compartments 17 in the respective casing members communicate, and I provide a steam or hot air inlet port, 18, in the top of the upper casing, 10, and an outlet or exhaust port, 19, in the bottom of the lower casing 9. The ends of the casing members are closed by walls, 20, in which are provided one or more passageways, 21, leading from the compartment, 17, to the center of the casing in order that the heating fluid may be admitted to the center of the annuluses 6 if desired. Screw plugs, 22, are also provided so that passageways 21 may be closed when desired.

The interior faces of the inner longitudinal walls of the casing members 9 and 10 are channelled at their ends, as at 23, to fit and receive a cylindrical edge 8 of the annuluses 6, while at suitable intervals between the end channels 23 are provided channels 24 similar to the channels 23 except they are sufficiently wide to receive and fit two adjacent cylindrical edges, 8—8. Between the channels 23 and 24 and intermediate the channels 24 are annular projections or shoulders, 25, which extend into the depressions 7, in the annuluses 6, and which have the form and configuration it is desired to impart to the outer surface of the article to be molded and vulcanized. The projections 25 are sufficiently smaller than the depressions 7 so as to leave therebetween a cavity, 26, to receive the material to be molded and vulcanized.

My apparatus is operated as follows: The material to be molded and vulcanized is placed in desired quantities upon the bottoms and sides of the depression 7 in a number of the inner matrix members 6. It is, of course, desirable to fill the casing formed of the members 9 and 10, but it is not necessary to the proper functioning of the device that the vulcanizing casing should be entirely filled. After the material has been placed in the bottoms and sides of the depression 7, the inner matrix members are inserted in the lower casing member 9, so that the cylindrical edges 8 are in the channels 23 and 24, or into two adjacent channels 24. The projections or shoulders, 25, upon the interior wall of the casing member 8, extend into the depressions 7. After the lower member 9 has been filled, or filled as far as desired, the upper member is swung over on its hinge 11 until the stud bolts 12 project through the slots 13, when the wing-nuts 14 are placed on the stud bolts and screwed down until the two members 9 and 10 are clamped together. Steam or other heating fluid is then introduced through the inlet port 18 and may also be admitted to the interior of the annuluses 6 through the passageway 21, by the operation of the screw plug 22 and the heat is maintained until the vulcanizing operation is completed. Instead of introducing steam into the inlet port 18 this port may be left open and the whole apparatus rolled into a vulcanizing chamber when the same results will be obtained.

The fitting of the cylindrical edges 8 into the channels 23 and 24 accomplishes a sufficient separation of the molding and vulcanizing cavities 26.

By the use of my invention a considerable economy of time, room, manual operations and heat are secured and a much more uniform product is obtained.

Having described my invention what I claim as new and desire to secure by Letters Patent is:

1. A molding and vulcanizing apparatus for producing annular objects comprising a series of separate interior matrices with abutting sides, said matrices being provided with peripheral depressions between cylindrical edges and a two-part exterior casing having channels to receive said cylindrical edge portions and projections forming with the depressions of said interior matrices molding and vulcanizing cavities, said exterior casing members being provided with communicating circumferential cavities for the circulation of the heating fluid.

2. A molding and vulcanizing apparatus for producing annular objects comprising a series of separate interior matrices with abutting sides, said matrices being provided with peripheral depressions between cylindrical edges and a two-part exterior casing having channels to receive said cylindrical edge portions and projections forming with the depressions of said interior matrices molding and vulcanizing cavities.

3. A molding and vulcanizing apparatus for producing annular objects comprising a series of separate interior matrices, said matrices being provided with peripheral depressions between cylindrical edges and a two-part exterior casing having channels to receive said cylindrical edge portions and projections forming with the depressions of said interior matrices moulding and vulcanizing cavities.

4. A molding and vulcanizing apparatus for producing annular objects comprising a series of separate interior matrices, said matrices being provided with peripheral depressions and a two-part exterior casing having projections forming with the depressions of said interior matrices molding and vulcanizing cavities.

JOHN L. G. DYKES.